(12) United States Patent
Ando

(10) Patent No.: US 10,252,341 B2
(45) Date of Patent: Apr. 9, 2019

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Yuichi Ando, Omihachiman (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/536,617

(22) PCT Filed: Dec. 15, 2015

(86) PCT No.: PCT/JP2015/085090
§ 371 (c)(1),
(2) Date: Jun. 16, 2017

(87) PCT Pub. No.: WO2016/098775
PCT Pub. Date: Jun. 23, 2016

(65) Prior Publication Data
US 2018/0001390 A1    Jan. 4, 2018

(30) Foreign Application Priority Data
Dec. 17, 2014 (JP) .................. 2014-255210

(51) Int. Cl.
*B23B 27/16*   (2006.01)
*B23B 27/04*   (2006.01)
(Continued)

(52) U.S. Cl.
CPC ............ *B23B 27/045* (2013.01); *B23B 27/04* (2013.01); *B23B 27/065* (2013.01);
(Continued)

(58) Field of Classification Search
CPC ...... B23B 27/045; B23B 27/04; B23B 27/145; B23B 27/16; B23B 27/1622;
(Continued)

(56) References Cited

U.S. PATENT DOCUMENTS 5,503,509 A * 4/1996 von Haas .............. B23B 51/048
                                                                408/188
6,527,485 B1   3/2003 Little
(Continued)

FOREIGN PATENT DOCUMENTS

DE         10042779 A1 *  3/2002  ............ B23B 27/08
DE    202013004041 U1 *  5/2013  ........... B23B 27/065
(Continued)

OTHER PUBLICATIONS

International Search Report (Form PCT/ISA/210) issued in PCT/JP2015/085090, dated Jan. 26, 2016.
(Continued)

*Primary Examiner* — Ryan C Rufo
(74) *Attorney, Agent, or Firm* — Viering, Jentschura & Partner MBB

(57) ABSTRACT

A cutting insert according to one aspect has a flat plate shape including a first main surface having a polygonal shape, a second main surface located opposite to the first main surface, and an outer peripheral surface located between the first main surface and the second main surface. The cutting insert includes a cutting portion located in regions including at least a corner portion of the first main surface, and a main body portion located in a region other than the corner portion. A thickness of the main body portion is larger than a thickness of the cutting portions, and the main body portion includes a recessed portion or a protruding portion located in the outer peripheral surface thereof.

13 Claims, 18 Drawing Sheets

(51) Int. Cl.
 *B23B 27/06* (2006.01)
 *B23B 29/04* (2006.01)
(52) U.S. Cl.
 CPC ........ *B23B 27/1622* (2013.01); *B23B 29/043* (2013.01); *B23B 27/16* (2013.01); *B23B 2200/048* (2013.01); *B23B 2200/049* (2013.01); *B23B 2200/121* (2013.01); *B23B 2200/165* (2013.01); *B23B 2200/369* (2013.01); *B23B 2205/12* (2013.01); *B23C 2220/36* (2013.01); *B23G 2200/10* (2013.01)
(58) Field of Classification Search
 CPC ............ B23B 27/1614; B23B 27/1611; B23B 2200/049; B23B 2200/0495; B23B 2200/166; B23B 29/043; Y10T 407/25
 See application file for complete search history.

(56) References Cited

U.S. PATENT DOCUMENTS

| | | | | |
|---|---|---|---|---|
| 7,645,100 | B2* | 1/2010 | Andersson | B23B 27/065 407/113 |
| 2001/0022123 | A1 | 9/2001 | Schiffers | |
| 2003/0156910 | A1* | 8/2003 | Friedman | B23B 27/08 407/117 |
| 2006/0257216 | A1* | 11/2006 | Kimura | B23B 27/1644 407/104 |
| 2011/0293382 | A1* | 12/2011 | Chistyakov | B23B 27/04 407/70 |
| 2012/0099935 | A1* | 4/2012 | Hecht | B23B 27/1614 407/100 |
| 2013/0089381 | A1* | 4/2013 | Morgulis | B23B 27/04 407/103 |
| 2013/0309028 | A1* | 11/2013 | Chistyakov | B23B 27/045 407/114 |
| 2013/0336734 | A1 | 12/2013 | Morgulis et al. | |
| 2014/0186130 | A1* | 7/2014 | Hecht | B23B 27/007 407/100 |
| 2014/0348601 | A1* | 11/2014 | Hecht | B23B 27/1622 407/104 |

FOREIGN PATENT DOCUMENTS

| | | | | |
|---|---|---|---|---|
| EP | 2805786 A1 | * | 11/2014 | ............. B23C 5/207 |
| JP | 02-90002 U1 | | 7/1990 | |
| JP | 2004261883 A | | 9/2004 | |
| JP | 2005-074531 A | * | 3/2005 | ............. B23B 27/16 |
| JP | 2007-075932 A | * | 3/2007 | ............. B23B 27/14 |
| WO | WO 2008062825 A1 | * | 5/2008 | ......... B23B 27/1625 |

OTHER PUBLICATIONS

Written Opinion (Form PCT/ISA/237) issued in PCT/JP2015/085090, dated Jan. 26, 2016.

* cited by examiner

CUTTING INSERT, CUTTING TOOL, AND METHOD FOR MANUFACTURING MACHINED PRODUCT

TECHNICAL FIELD

An aspect relates to a cutting insert used in machining, a cutting tool, and a method for manufacturing a machined product.

BACKGROUND ART

In the related art, throw-away cutting tools such as that described in Japanese Unexamined Patent Application Publication No. 2005-074531 (Patent Document 1) are known as cutting tools used in machining such as grooving and threading. A throw-away tip (cutting insert) of the throw-away cutting tool described in Patent Document 1 has a flat plate shape including two main surfaces with triangular shapes and an outer peripheral surface. Additionally, a recessed portion that engages with a protruding portion of a holder is provided in the outer peripheral surface.

In recent years, a demand has arisen for a cutting insert that can be used for machining where larger loads are applied. With the throw-away tip described in Patent Document 1, the thickness (space between the two main surfaces) of the recessed portion that engages with the holder is narrow and, consequently, there is a possibility that the durability thereof will be insufficient for machining in cases where larger loads are applied.

An object of this aspect is to provide a cutting insert that can be stably locked in a holder even when performing machining where a large load is applied.

SUMMARY OF INVENTION

A cutting insert according to one aspect has a flat plate shape including a first main surface having a polygonal shape, a second main surface located opposite to the first main surface, and an outer peripheral surface located between the first main surface and the second main surface. In such a cutting insert, a region including a through-hole penetrating the first main surface and the second main surface and surrounding of the through-hole is a main body portion; and regions other than the main body portion are corner portions, at least one of corner portions being a cutting portion.

Moreover, the main body portion has a thickness larger than a thickness of the cutting portion, and a recessed portion or a protruding portion is provided in a main body portion outer peripheral surface of the main body portion.

DESCRIPTION OF EMBODIMENTS

Figure 1:
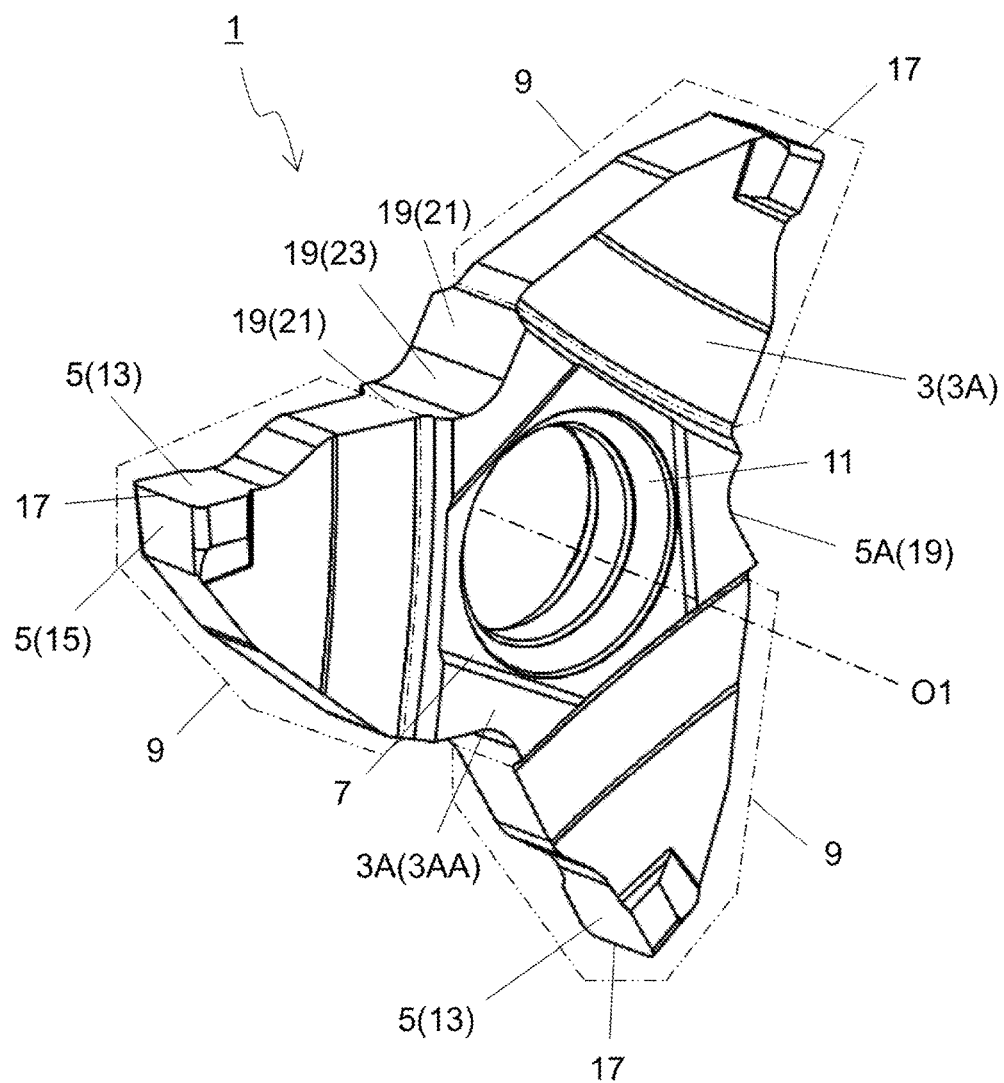
FIG. 1 is a perspective view illustrating a cutting insert according to an embodiment.

The following describes in detail a cutting insert 1 of an embodiment while referencing the drawings. However, for ease of explanation, each of the drawings referenced below is simplified and illustrates only the main constituent members needed to describe the present embodiment. Accordingly, the cutting tool of the present invention may be provided with other constituent members which are not illustrated in the referenced drawings. Further, the dimensions of the members in the drawings do not faithfully represent the actual dimensions of the constituent members, the dimension ratios of the members, or the like.

The cutting insert 1 of the present embodiment (hereinafter also referred to simply as "insert 1") has a flat plate shape including a pair of polygonal main surfaces 3 and an outer peripheral surface 5 located between the pair of main surfaces 3. In this specification, one of the pair of main surfaces 3 is referred to as a first main surface 3A and the other is referred to as a second main surface 3B.

The second main surface 3B is located on a side of the insert 1 opposite to the first main surface 3A. In the present embodiment, the first main surface 3A and the second main surface 3B have identical shapes, and are both triangular. Because the first main surface 3A and the second main surface 3B have identical shapes and the contours thereof overlap, the contour of the other main surface cannot be confirmed in a front view of the insert 1 from the first main surface 3A side or the second main surface 3B side. When securing the insert 1 in a holder of a cutting tool, one of the first main surface 3A and the second main surface 3B contacts the holder.

FIGS. 1 to 7 are drawings of the insert 1 of the present embodiment, viewed from various directions.

The insert 1 having the flat plate shape is provided with a main body portion 7 and corner portions. In a front view of the insert 1 from the first main surface 3A side or the second main surface 3B side, the main body portion 7 is located in a center portion. Additionally, the regions other than the main body portion 7 are the corner portions, and at least one of the corner portions is a cutting portion 9. In FIGS. 1 to 7, an example is illustrated in which all of the corner portions are cutting portions 9 and, as such, the portions corresponding to the corner portions are marked with the reference sign 9. In other words, in this configuration, the main body portion 7 is located in a region excluding the cutting portions 9.

Additionally, because the main surfaces 3 in the present embodiment have a triangular shape, the first main surface 3A has three corner portions. As such, the insert 1 of the present embodiment is constituted by one main body portion 7 and three cutting portions 9. The three cutting portions 9 are located so as to be rotation-symmetrical about a central axis O1 connecting the centers of the first main surface 3A and the second main surface 3B.

A length of one side of the triangular main surfaces 3 of the insert 1 of the present embodiment is set, for example, to about from 15 to 25 mm. Additionally, a maximum value of a thickness of the insert, which is the space between the first main surface 3A and the second main surface 3B, is set, for example, to about from 2 to 8 mm.

Examples of the material of the member constituting the insert 1 include cemented carbide alloy, cermet, or the like. Examples of the composition of the cemented carbide alloy include, for example, WC—Co, WC—TiC—Co, and WC—TiC—TaC—Co. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound such as titanium carbide (TiC), or titanium nitride (TiN) is the main component.

The surface of the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

The main body portion 7 includes a through-hole 11 open in each of the first main surface 3A and the second main surface 3B. As such, the through-hole 11 and the surrounding of the through-hole 11 constitute the main body portion 7. The through-hole 11 is a portion through which a screw is inserted when the insert 1 is screw-fastened and secured to the holder of a cutting tool. Note that instead of the screw-fastening and securing method, a clamp structure may be utilized as the method for securing the insert 1 in the holder.

Figure 2:
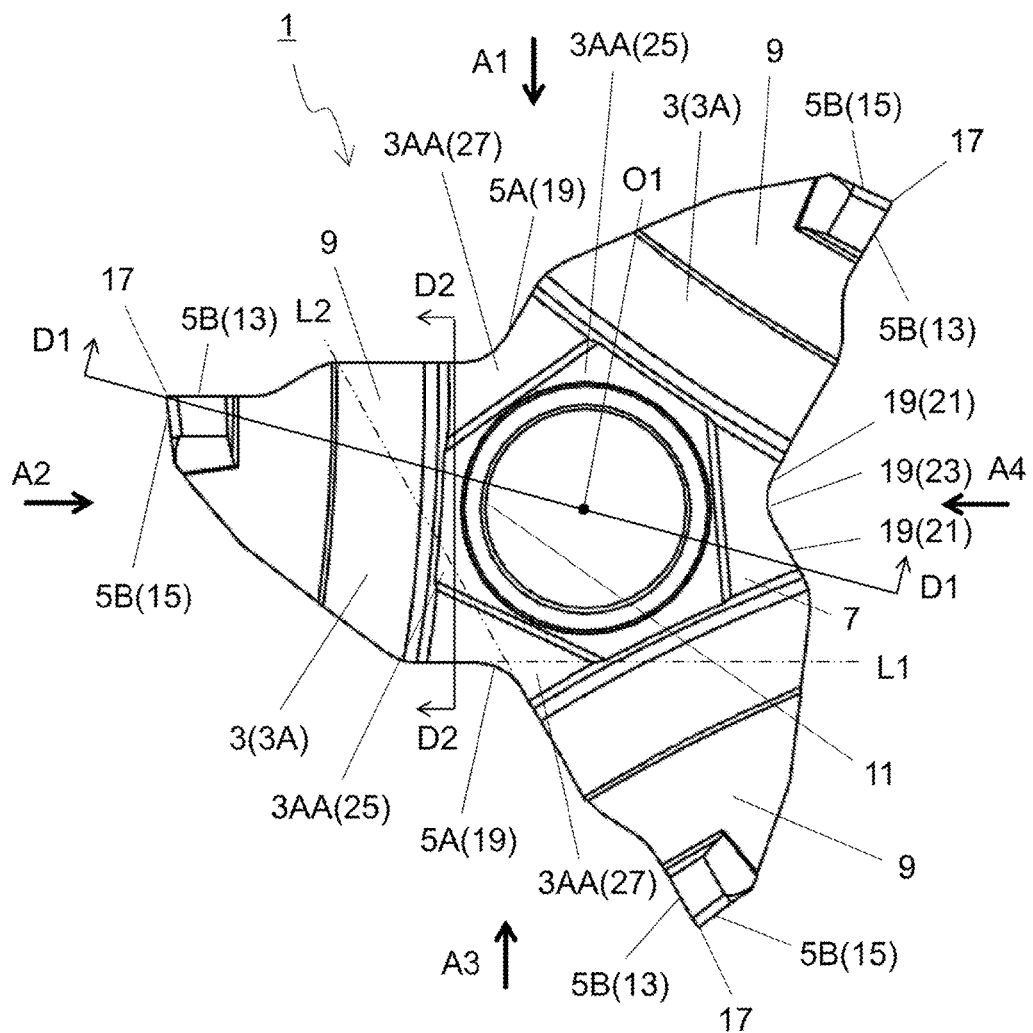
FIG. 2 is a front view of the cutting insert illustrated in FIG. 1, viewed from a first main surface 3A side.
Figure 3:
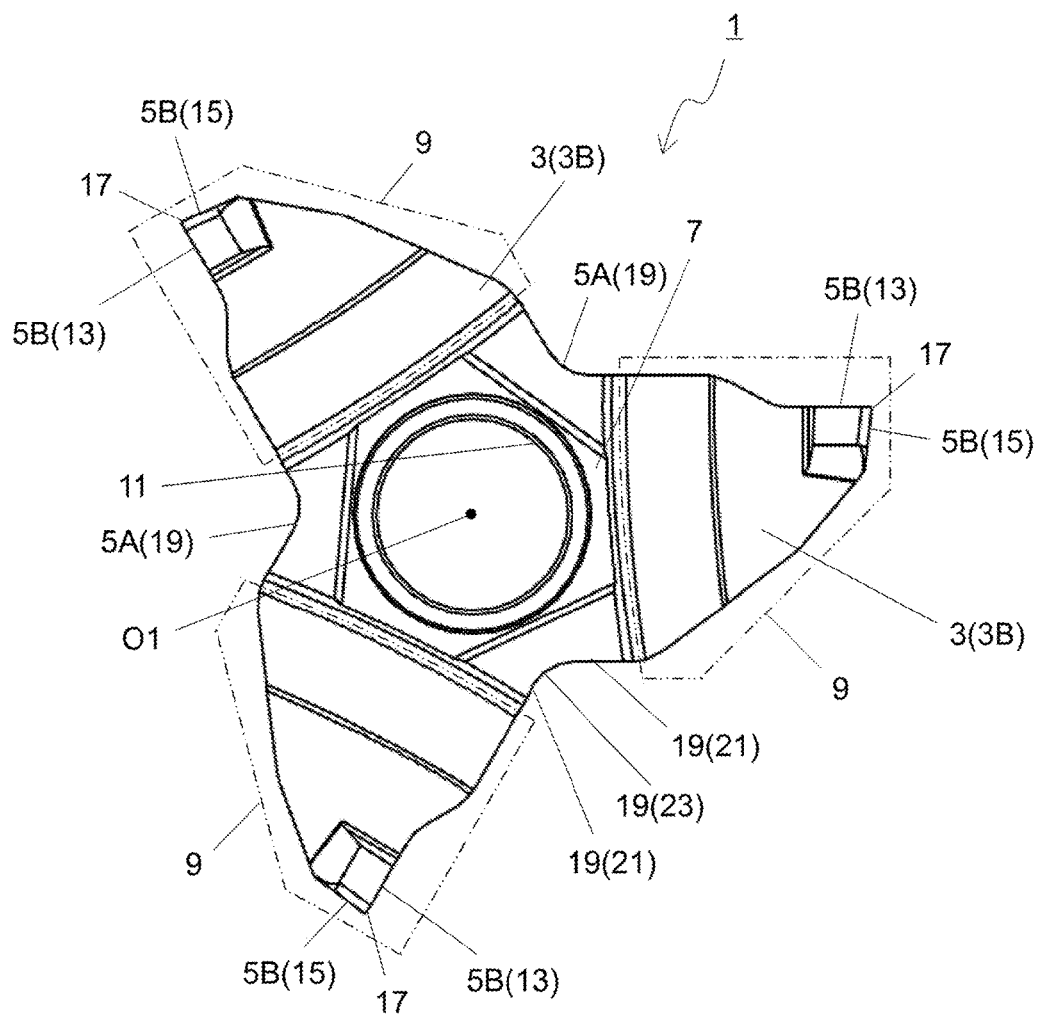
FIG. 3 is a front view of the cutting insert illustrated in FIG. 1, viewed from a second main surface 3B side.

As illustrated in FIG. 2, in a front view of the insert 1 from the first main surface 3A side, the through-hole 11 has a circular shape with a diameter of, for example, from 4 to 7 mm. In the example illustrated in FIG. 2, the center of the opening of the through-hole 11 on the first main surface 3A side matches the center of the first main surface 3A. The same is true in FIG. 3, which is a front view of the insert 1 from the second main surface 3B side. The second main surface 3B is the side opposite the first main surface 3A.

Figure 4:
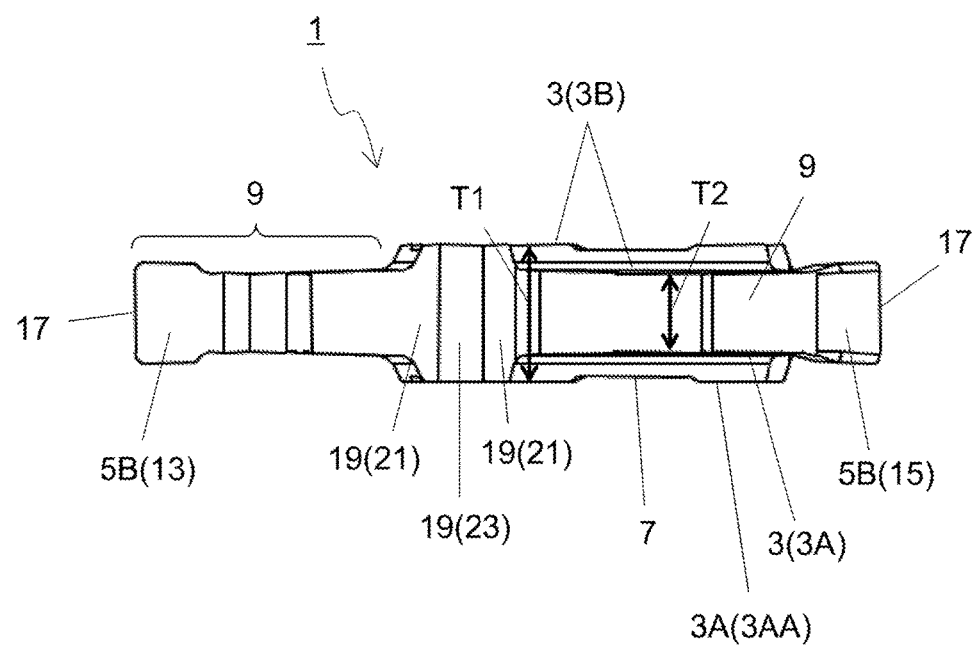
FIG. 4 is a side view of the cutting insert illustrated in FIG. 2 as viewed from an A1 direction.
Figure 5:
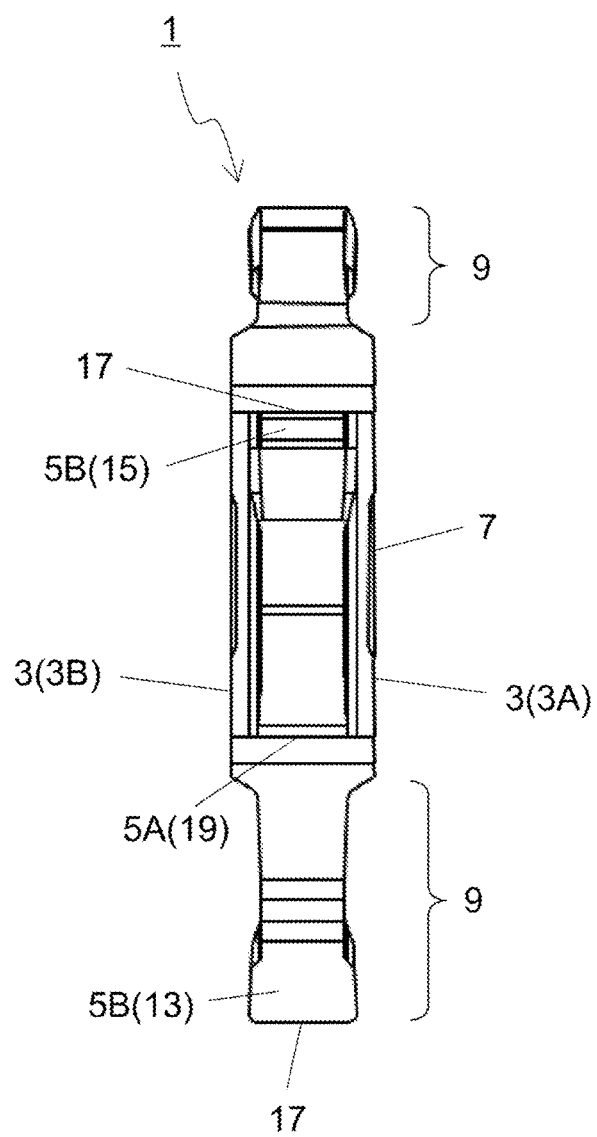
FIG. 5 is a side view of the cutting insert illustrated in FIG. 2 as viewed from an A2 direction.
Figure 6:
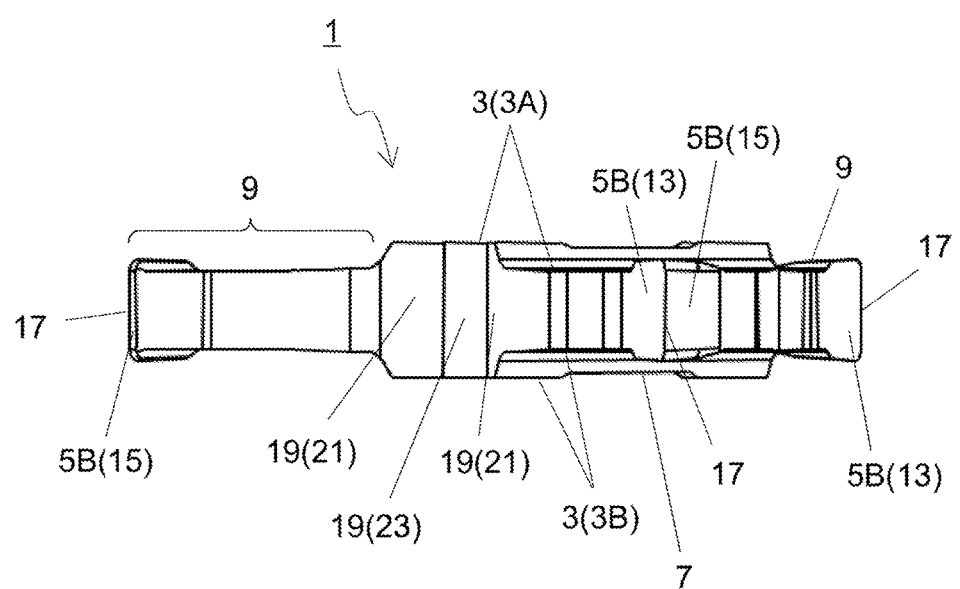
FIG. 6 is a side view of the cutting insert illustrated in FIG. 2 as viewed from an A3 direction.
Figure 7:
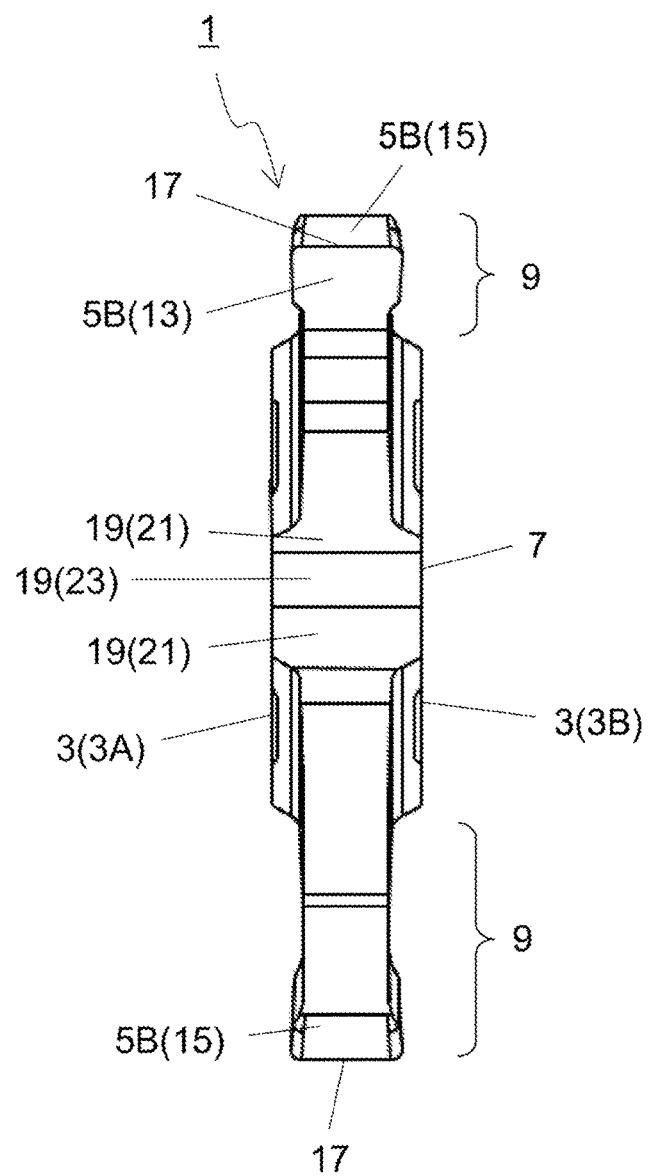
FIG. 7 is a side view of the cutting insert illustrated in FIG. 2 as viewed from an A4 direction.
Figure 8:
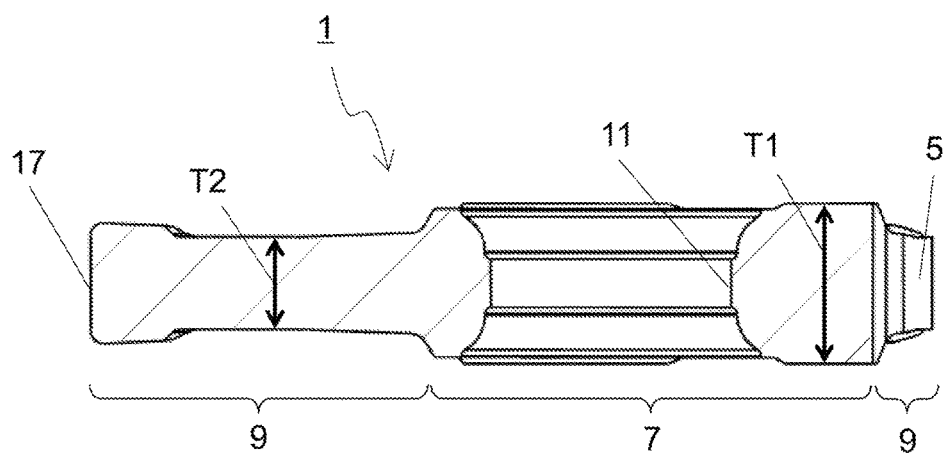
FIG. 8 is a cross-sectional view taken along a cross-section D1-D1 of the cutting insert illustrated in FIG. 2.

The thickness between the first main surface 3A and the second main surface 3B is different for the main body portion 7 and the cutting portions 9 in the present embodiment. Specifically, as illustrated in FIGS. 4 and 8, in the present embodiment, a thickness T1 of the main body portion 7 is larger than a thickness T2 of the cutting portions 9. That is, the region including the center portions of the first main surface 3A and the second main surface 3B where the thickness is relatively large is the main body portion 7, and the regions where the thickness is relatively small are the cutting portions 9.

The thickness of the cutting portions 9 is configured to be relatively small so that the main surfaces 3 of the cutting portions 9 are less apt to contact the machined wall surface of the workpiece and damage the machined wall surface. Additionally, the thickness of the main body portion 7 is configured to be relatively large to stably secure the insert 1 in the holder.

A rake face 13, a relief face 15, and a cutting edge 17 are formed on a cutting portion outer peripheral surface 5B of each of the cutting portions 9. The rake face 13 is located in a region of the cutting portion outer peripheral surface 5B corresponding to one face forming the triangular corner. The relief face 15 is located in a region of the cutting portion outer peripheral surface 5B corresponding to the other face forming the triangular corner. The cutting edge 17 is located at a portion where the rake face 13 and the relief face 15 intersect. In other words, the cutting edge 17 is located in a region of the cutting portion outer peripheral surface 5B connecting the corners of the pair of main surfaces 3A and 3B. Machining is performed by bringing this cutting edge 17 into contact with the workpiece.

The portion where the relief face 15 and the rake face 13 intersect need not be a strict linear shape obtained by the intersecting of the two faces. If the portion where the two faces intersect is pointed at an acute angle, the durability of the cutting edge 17 will decline. Therefore, the portion where the relief face 15 and the rake face 13 intersect may have a slightly curved surface shape, that is, may be subjected to a honing process.

The insert 1 of the present embodiment of the example illustrated in FIGS. 1 to 7 includes three of the cutting portions 9 and, as such, three of the cutting edges 17 are formed. These three cutting edges 17 are not simultaneously used when machining. That is, machining is performed using one of the three cutting edges 17. When the cutting edge 17 being used becomes worn, a different cutting edge 17 can be newly used in the machining by changing the securing position of the insert 1 in the holder.

A recessed portion 19 is provided in a main body portion outer peripheral surface 5A of the main body portion 7. The recessed portion 19 is a portion for locking the insert 1 in the holder when securing the insert 1 in the holder. The main body portion 7 in the present embodiment includes regions of the main body portion outer peripheral surface 5A corresponding to each of the three sides of the triangular main surfaces 3. The main body portion 7 in the present embodiment includes three of the recessed portions 19. The three cutting portions 9 are located so as to be rotation-symmetrical about the central axis O1 connecting the centers of the pair of main surfaces 3A and 3B and, as such, the three recessed portions 19 are located so as to be rotation-symmetrical about this central axis O1.

When machining, the insert 1 is subjected to forces that act to rotate the insert 1 about the through-hole 11. However, because the insert 1 includes the recessed portions 19 described above, the insert 1 is stably secured in the holder and rotation of the insert 1 can be less apt to occur.

In recent years, demands have arisen for an insert 1 that can be used for machining where larger loads are applied. However, there is a possibility that durability will be insufficient if the recessed portions 19 are formed in portions overlapping the cutting portions 9 in the present embodiment, which are portions where the thickness is relatively thin. This is because the surface area of each of the recessed portions 19 decreases at the portion where the thickness is relatively small. However, with the insert 1 of the present embodiment, the recessed portions 19 are located in the main body portion 7 where the thickness is relatively larger than the cutting portions 9. As a result, it is possible to stably lock the insert 1 in the holder even when machining where a large load is applied.

The recessed portions 19 in the present embodiment extend in a direction orthogonal to the first main surface 3A and the second main surface 3B to stably secure the insert 1 in the holder. In other words, inner faces of the recessed portions 19 are orthogonal to the main surfaces 3. In cases where the recessed portions 19 extend in a direction inclined with respect to the pair of main surfaces 3, the forces applied to the insert 1 when machining are dispersed in the direction inclined with respect to the main surfaces 3 and, as a result, the insert 1 may move in a direction orthogonal to the main surfaces 3. However, when the recessed portions 19 extend in a direction orthogonal to the main surfaces 3, this movement of the insert 1 can be less apt to occur.

The recessed portions 19 in the present embodiment are located across the first main surface 3A and the second main surface 3B to obtain a large area whereby the insert 1 is locked in the holder, and stably secure the insert 1 in the holder.

Figure 10:
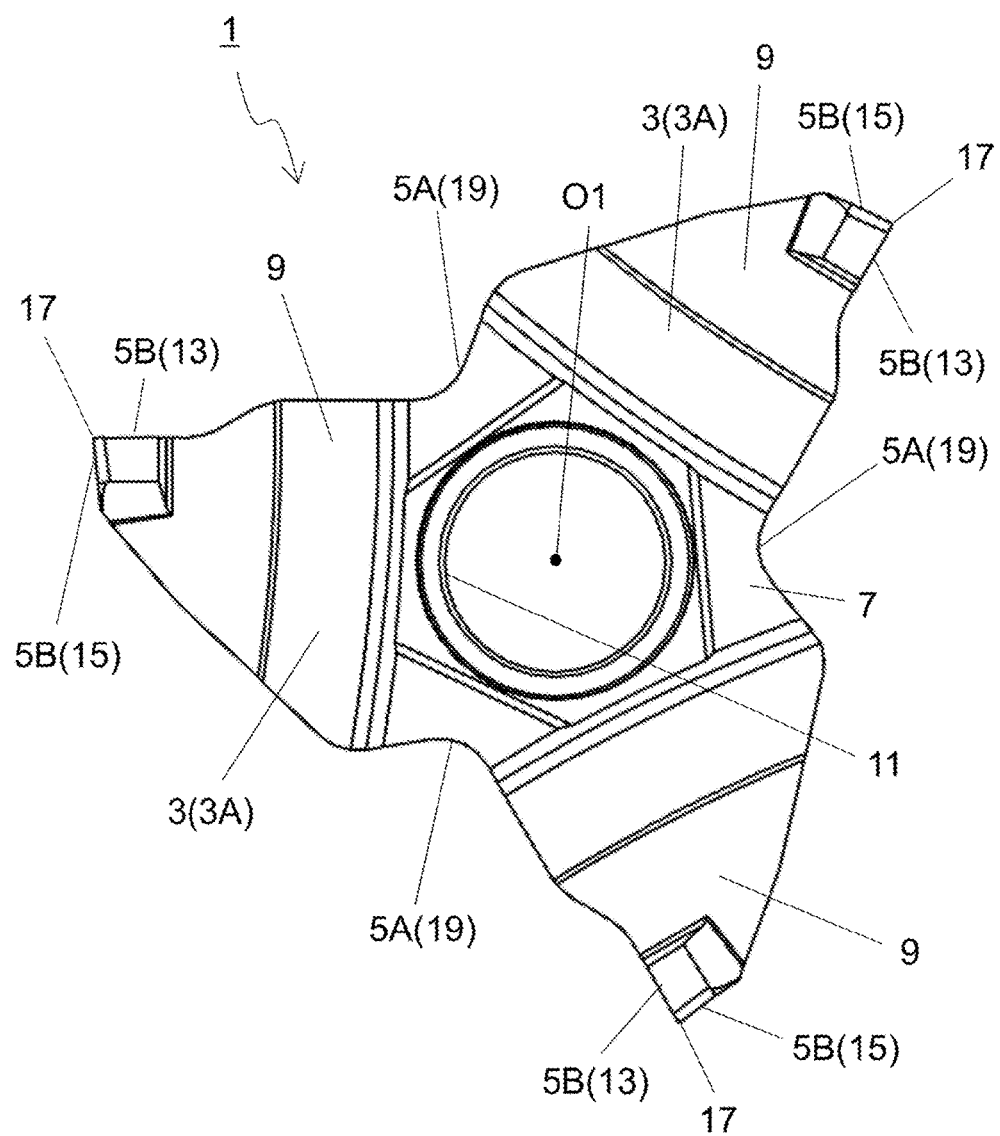
FIG. 10 is a front view illustrating a first modified example of the cutting insert, viewed from the first main surface 3A side.

Additionally, in a front view of the insert 1 from the first main surface 3A side, the recessed portions 19 may be constituted from a single curved portion as illustrated in FIG. 10. However, the recessed portions 19 in the present embodiment include a curved surface portion 23 located between a pair of flat surface portions 21 as in the example illustrated in FIG. 3. In other words, a flat surface portion 21 is located on both sides of the curved surface portion 23.

When the recessed portions 19 include the flat surface portions 21, it is easier to bring the insert 1 into surface contact with the holder at the recessed portions 19. In cases where the recessed portions 19 are constituted only from the curved surface portion 23, to bring the recessed portions 19 into surface contact with the holder, the curved surface must be formed with high precision so that the portions of the holder contacting the recessed portions 19 match the curved surface shape of the recessed portions.

However, when the recessed portions 19 include the flat surface portions 21, it is sufficient that flat surfaces corresponding to the flat surface portions 21 be provided in the holder, and it is not necessary to provide curved surface portions with high precision at the portions of the holder that contact the recessed portions 19. As such, it is easier to bring the recessed portions 19 into surface contact with the holder.

Here, it is preferable that the flat surface portions 21 be orthogonal to the pair of main surfaces 3 because the forces applied to the insert 1 when machining is stably received by the holder. Note that, with the exception of the recessed portions 19, a modified example illustrated in FIG. 10 has the same configuration as the embodiment illustrated in FIGS. 1 to 9.

Additionally, in cases where the recessed portions 19 are constituted only from the pair of flat surface portions 21, a corner is formed in the bottom of the recessed portions at the portion where the pair of flat surface portions 21 intersect. Consequently, load is more likely to concentrate at this corner. However, when the recessed portions 19 include the curved surface portion 23 located between the pair of flat surface portions 21 as with the recessed portions 19 of the present embodiment, concentration of this load can be decreased. As a result, the durability of the insert 1 can be increased.

Additionally, in the insert 1 of the present embodiment, as illustrated in FIG. 2, the through-hole 11 is not located on imaginary extended lines L1 and L2 of the pair of flat surface portions 21 located on both sides of the recessed portions 19, and the through-hole 11 is separated from the imaginary extended lines L1 and L2 of the pair of flat surface portions 21. In other words, in a front view of the first main surface 3A, the through-hole 11 is located in a region defined by imaginary extended lines of the flat surface portions 21.

If the through-hole 11 is located on the imaginary extended lines L1 and L2 of the pair of flat surface portions 21, the thickness between the recessed portions 19 and the through-hole 11 will become small. However, when the through-hole 11 is not located on the imaginary extended lines L1 and L2, a large thickness between the recessed portions 19 and the through-hole 11 can be ensured. Thus, the durability of the insert 1 can be increased even more.

Additionally, in cases where the pair of flat surface portions 21 is provided facing the through-hole 11 such that the imaginary extended lines L1 and L2 of the pair of flat surface portions 21 cross the through-hole 11, the angle formed by the pair of flat surface portions 21 may become small and the curvature of the curved surface portion 23 may decline. However, when the pair of flat surface portions 21 is located as illustrated in FIG. 2, the curvature of the curved surface portion 23 can be increased and, as such, the possibility of stress concentrating in the curved surface portion 23 can be reduced.

The first main surface 3A may be constituted from a flat surface, but, as illustrated in FIG. 2, in the present embodiment, a region of the first main surface 3A located in the main body portion 7, namely a main body portion first main surface 3AA, includes a first region 25 and a second region 27. The first region 25 is a flat surface region located surrounding the opening of the through-hole 11. Additionally, the second region 27 is a flat surface region located between the first region 25 and the recessed portions 19. Note that in the illustrated example, a region of the second main surface 3B located in the main body portion 7, namely a main body portion second main surface 3BB, has a configuration identical to that of the main body portion first main surface 3AA.

Figure 9:
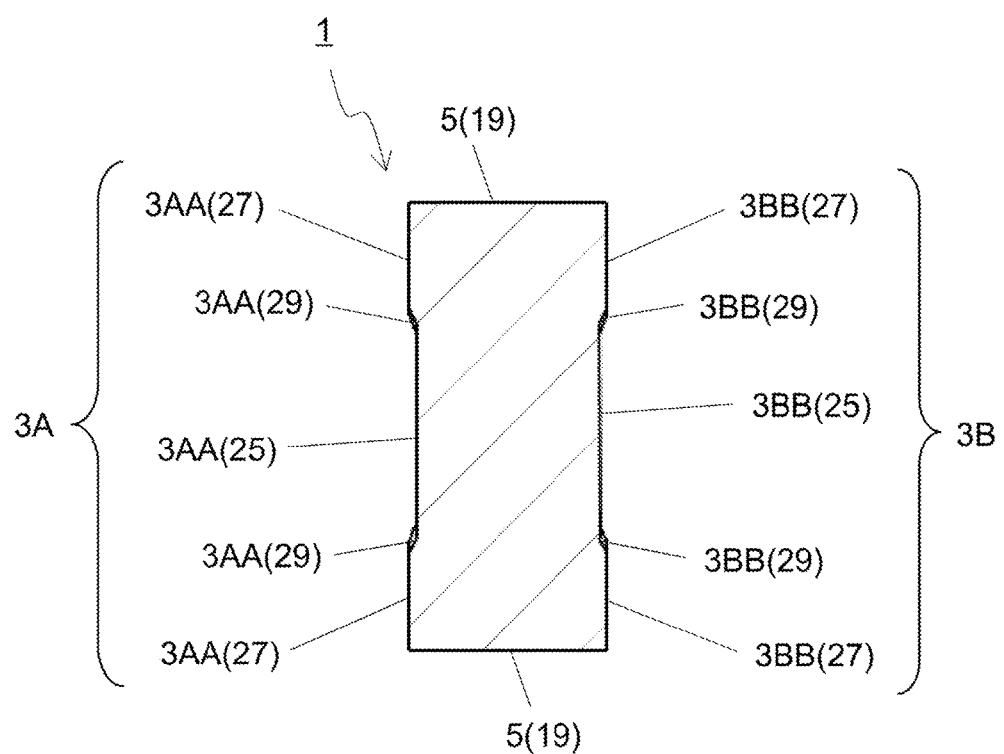
FIG. 9 is a cross-sectional view taken along a cross-section D2-D2 of the cutting insert illustrated in FIG. 2.

Additionally, the main body portion first main surface 3AA further includes an inclined surface 29 in addition to the first region 25 and the second region 27 in the main body portion 7. The inclined surface 29 is located between the first region 25 and the second region 27, and is inclined with respect to the first region 25 and the second region 27. As illustrated in FIG. 9, the first regions 25 and the second regions 27 are parallel to each other, and the thickness of the main body portion 7 between the second regions 27 is greater than the thickness of the main body portion 7 between the first regions 25.

The insert 1 of the present embodiment is secured in the holder by a screw inserted through the through-hole 11. Thus, in cases where the pair of main surfaces 3 is constituted from a single flat surface, the head of the screw is more likely to protrude outward from the flat surface. Consequently, chips may contact the head of the screw and cause chip clogging, damage to the head of the screw, or the like.

However, when the main body portion first main surface 3AA includes the first region 25 and the second region 27 and the thickness of the first region 25 surrounding the opening of the through-hole 11 is smaller than the thickness of the second region 27, the second region 27 functions as a barrier and the possibility of the chips contacting the head of the screw is reduced.

The thicknesses at the first region 25 and the second region 27 are different from each other. As such, a step is formed at the boundary between the first region 25 and the second region 27, and the load may be more likely to concentrate at this step when screwing and securing the insert 1 in the holder. However, because the inclined surface 29 is located between the first region 25 and the second region 27, this concentrating of the load can be decreased.

Note that it is preferable that the inclined surface 29 be smoothly connected to the first region 25 and the second region 27 by a curved surface. Particularly, to decrease the concentration of stress at the boundary between the first region 25 and the inclined surface 29, it is preferable that the inclined surface 29 be smoothly connected to the first region 25 by a curved surface.

An embodiment of the insert 1 is described above. However, the present invention is not limited to the aforementioned embodiment and may include various modifications within a scope that does not deviate from the spirit of the present invention.

For example, the shape of the pair of main surfaces 3 is not limited to that in the embodiment described above. In the present embodiment, an example is described of the insert 1 in which the pair of main surfaces 3 has a triangular shape. However, a configuration is possible in which the shape of the pair of main surfaces 3 is quadrilateral or pentagonal.

Figure 11:
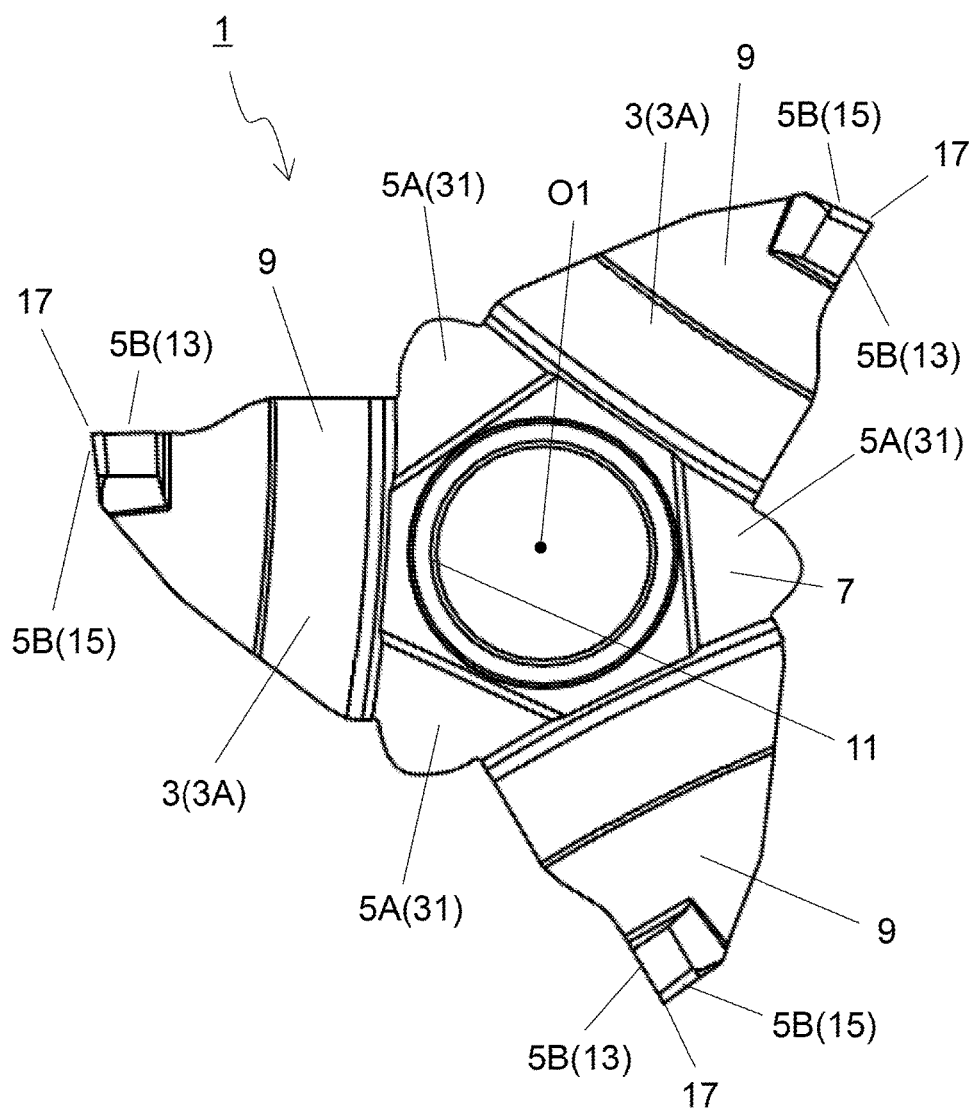
FIG. 11 is a front view illustrating a second modified example of the cutting insert, viewed from the first main surface 3A side.
Figure 12:
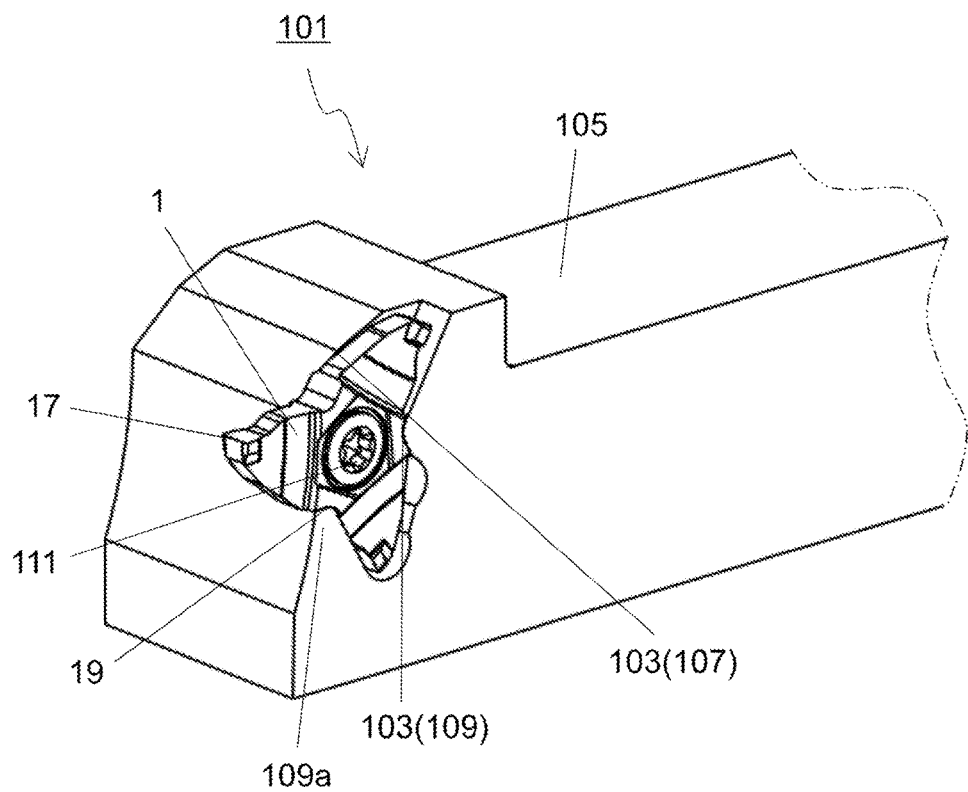
FIG. 12 is an enlarged perspective view of a leading end portion of a cutting tool according to an embodiment.
Figure 13:
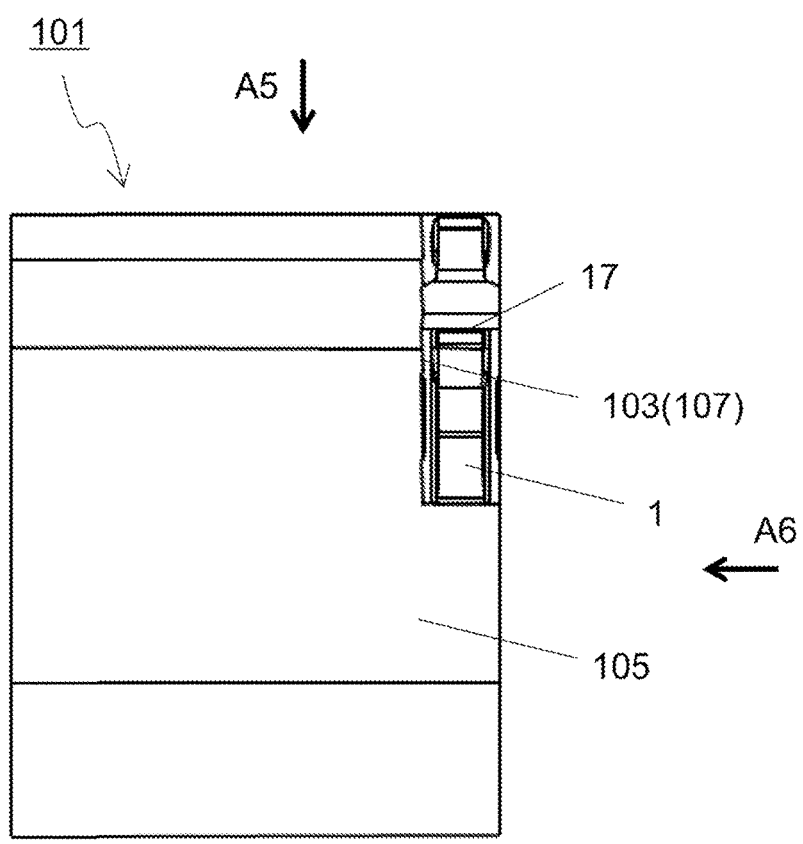
FIG. 13 is a side view of the cutting tool illustrated in FIG. 12 as viewed from the leading end.
Figure 14:
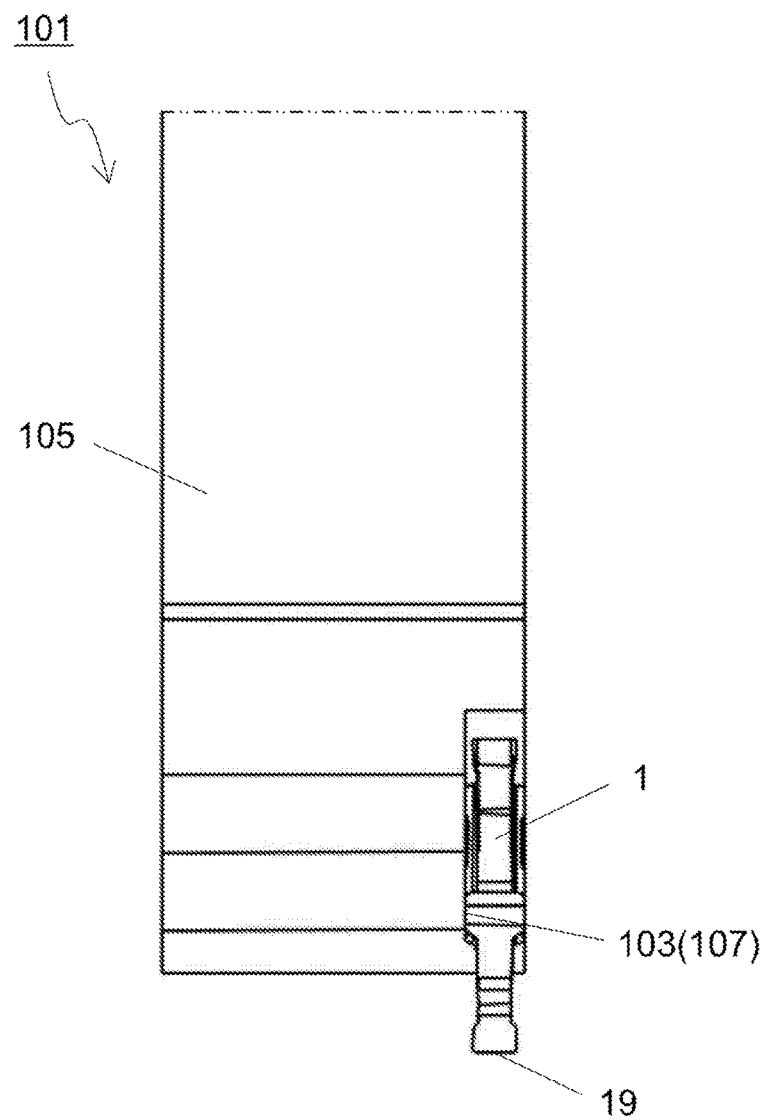
FIG. 14 is a side view of the cutting tool illustrated in FIG. 13 as viewed from an A5 direction.
Figure 15:
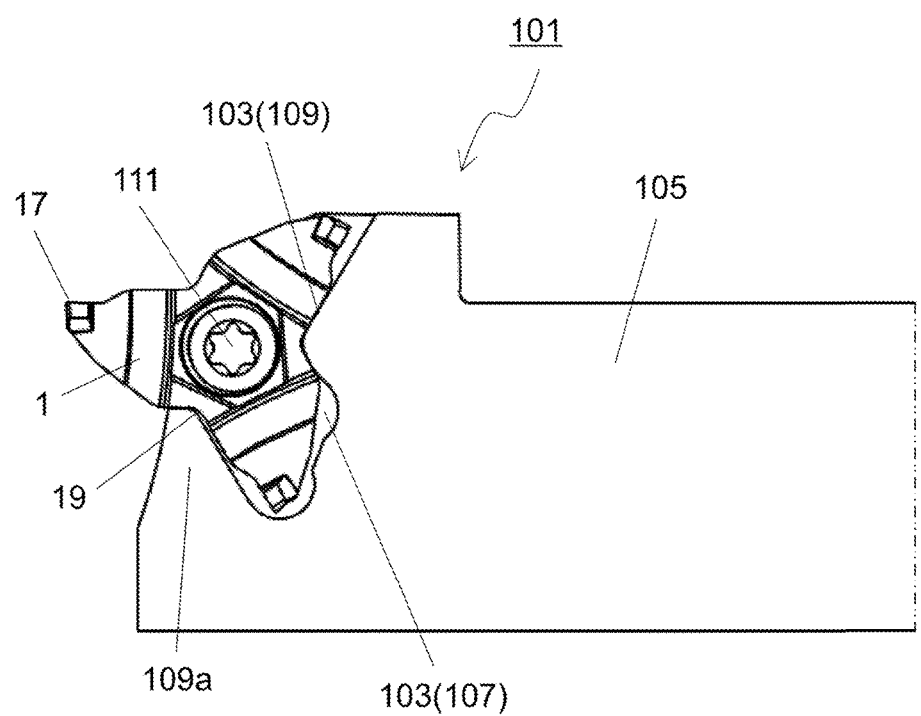
FIG. 15 is a side view of the cutting tool illustrated in FIG. 13 as viewed from an A6 direction.

Additionally, in the preceding description, a configuration in which the recessed portions 19 are provided in the main body portion outer peripheral surface 5A is described. However, as illustrated in FIG. 11, a configuration is possible in which protruding portions 31 are provided instead of the recessed portions 19. In this case, as with the recessed portions 19, the protruding portions 31 are portions for locking the insert 1 in the holder when securing the insert 1 in the holder. Even when these protruding portions 31 are provided, the insert 1 is stably secured in the holder.

Cutting Tool

Next, a description will be given of a cutting tool of an embodiment of the present invention using the drawings.

The cutting tool 101 in the present embodiment is provided with a holder 105 and the above-described cutting insert 1. The holder 105 includes an insert pocket 103 (hereinafter also referred to simply as the "pocket 103") on a leading end thereof, and the cutting insert 1 is positioned in the pocket 103, as illustrated in FIGS. 12 to 15. The insert 1 is configured to be mounted in the pocket 103 with the cutting edge 9 protruding outward from the leading end of the holder 105.

The holder 105 forms a long and slender rod shape. Moreover, one pocket 103 is located at the leading end of the holder 105. The pocket 103 is a portion in which the insert 1 is mounted, and is opened to a leading end surface and a side surface of the holder 105. At this time, the pocket 103 is opened to the side surface of the holder 105, making it possible to easily mount the insert 1.

As illustrated in FIGS. 12 to 15, the pocket 103 includes a seating face 107 that contacts the main surface 3 of the insert 1, and a binding side face 109 that contacts the outer peripheral surface 5 of the insert 1. The binding side face 109 includes a convex portion 109a corresponding to the recessed portion 19 of the insert 1, and this convex portion 109a of the binding side face contacts the recessed portion 19 of the insert 1.

The insert 1 is configured to be mounted in the pocket 103. The insert 1 is configured to be mounted with the cutting edge 17 protruding outward from the leading end of the holder 105. Here, in cases where the insert 1 includes a plurality of cutting edges 17, the insert 1 is configured to be mounted with one of the plurality of cutting edges 17 protruding from the leading end of the holder 105.

In the present embodiment, the insert 1 is mounted on the holder 105 using a screw 111. That is, the insert 1 is mounted on the holder 105 by inserting the screw 111 into the through-hole 11 of the insert 1, inserting a tip end of this screw 111 into a screw hole formed in the pocket 103, and screwing thread portions thereof.

For the holder 105, it is possible to use steel, cast iron, or the like. In particular, it is preferable to use steel with a high toughness in these members.

Method for Manufacturing a Machined Product

Next, a description will be given of a method for manufacturing a machined product of an embodiment of the present invention while referencing the drawings.

The machined product is manufactured by machining a workpiece 201.

The method for manufacturing a machined product in the present embodiment includes the following steps. That is, the present embodiment includes:

(1) Rotating the workpiece 201, (2) Bringing the cutting tool 101 represented in the embodiment described above into contact with the workpiece 201 that is rotating, and (3) Separating the cutting tool 101 from the workpiece 201.

Figure 16:
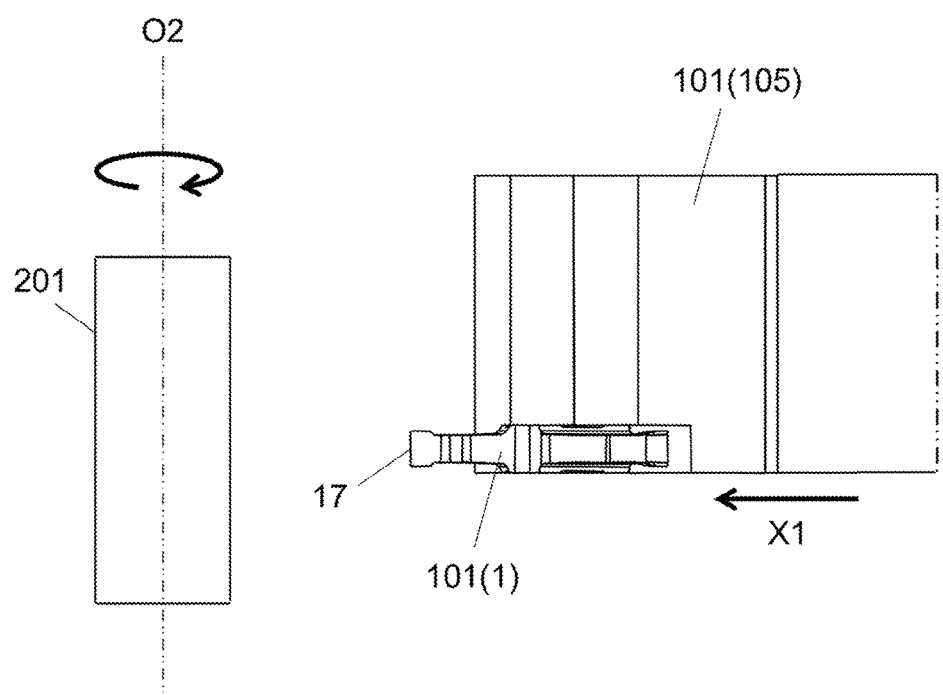
FIG. 16 is a perspective view illustrating a step of a method for manufacturing a machined product of an embodiment.
Figure 17:
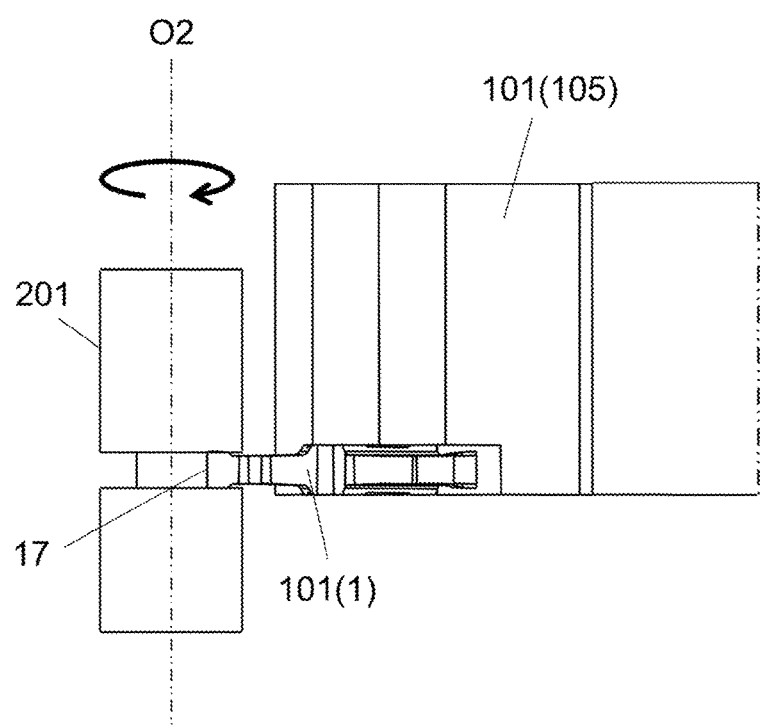
FIG. 17 is a perspective view illustrating a step of a method for manufacturing a machined product of an embodiment.
Figure 18:
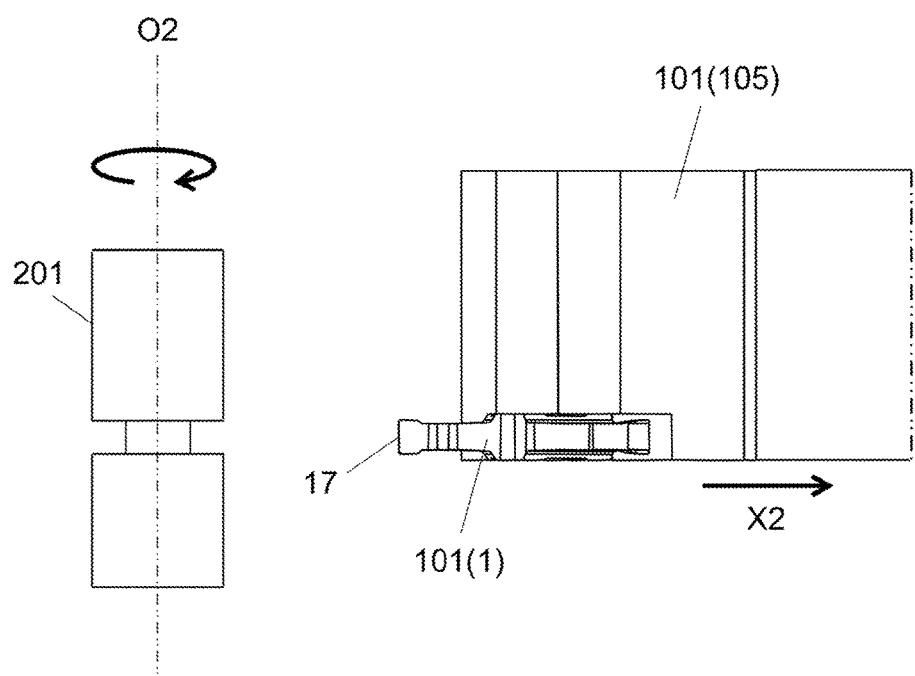
FIG. 18 is a perspective view illustrating a step of a method for manufacturing a machined product of an embodiment.

More specifically, first, as illustrated in FIG. 16, the workpiece 201 is made to rotate about an axis O2, and the cutting tool 101 is brought relatively close to the workpiece 201. Then, as illustrated in FIG. 17, the cutting edge 17 of the cutting tool 101 is brought into contact with the workpiece 201 that is rotating, and the workpiece 201 is cut. Next, as illustrated in FIG. 18, the cutting tool 101 is relatively moved away from the workpiece 201.

In the present embodiment, the cutting tool 101 is brought close to the workpiece 201 by being moved in the direction X1 in a state where the axis O2 is fixed and the workpiece 201 is rotating. Furthermore, in FIG. 17, the workpiece 201 is cut by bringing the cutting edge 17 of the cutting insert 1 into contact with the workpiece 201 that is rotating. Furthermore, in FIG. 18, the cutting tool 101 is moved away from the workpiece 201 by being moved in the direction X2, while the workpiece 201 is rotating.

Furthermore, in the machining of the manufacturing method of the present embodiment, in each of the respective steps, although the cutting tool 101 is brought into contact with or separated from the workpiece 201 by moving the cutting tool 101, the present embodiment is of course not limited to such a mode.

For example, in step (1), the workpiece 201 may be brought close to the cutting tool 101. In the same manner, in step (3), the workpiece 201 may be moved away from the cutting tool 101. In a case where the machining is to be continued, steps of bringing the cutting edge 17 of the insert 1 into contact with different places on the workpiece 201 may be repeated while maintaining the rotating state of the workpiece 201.

Here, representative examples of the material of the workpiece 201 include carbon steel, alloy steel, stainless steel, cast iron, non-ferrous metals, or the like.

REFERENCE SIGNS LIST

1 Cutting insert (insert)
3 Main surface
3A First main surface
3AA Main body portion first main surface
3B Second main surface
3BB Main body portion second main surface
5 Outer peripheral surface
5A Main body portion outer peripheral surface
7 Main body portion
9 Cutting portion
11 Through-hole
13 Rake face
15 Relief face
17 Cutting edge
19 Recessed portion
21 Flat surface portion
23 Curved surface portion
25 First region
27 Second region
29 Inclined surface
31 Protruding portion
101 Cutting Tool
103 Insert pocket (pocket)
105 Holder
107 Seating face
109 Binding side face
111 Screw
201 Workpiece

What is claimed is:

1. A cutting insert comprising
a body having a flat plate shape and comprising:
a first main surface having a polygonal shape;
a second main surface located opposite to the first main surface;
an outer peripheral surface located between the first main surface and the second main surface;
a through-hole penetrating the first main surface and the second main surface;
a main body portion which is a region of the body including the through-hole and surrounding of the through-hole; and
corner portions which is a region other than the main body portion, at least one of the corner portions being a cutting portion,
wherein the main body portion has a thickness larger than a thickness of the cutting portion, and
the main body portion comprises:
a main body portion outer peripheral surface that is located between the first main surface and the second main surface,
a recessed portion,
a first region located along a perimeter of the through-hole, and
a second region located at least along the recessed portion of the main body portion outer peripheral surface and further from the through-hole than the first region, wherein the second region is thicker than the first region;
wherein the recessed portion consists essentially of one or more surfaces extending orthogonally from the first main surface to the second main surface for the thickness of the main body portion.

2. A cutting insert comprising
a body having a flat plate shape and comprising:
a first main surface having a polygonal shape;
a second main surface located opposite to the first main surface;
an outer peripheral surface located between the first main surface and the second main surface;
a through-hole penetrating the first main surface and the second main surface;
a main body portion which is a region of the body including the through-hole and surrounding of the through-hole; and
corner portions which is a region other than the main body portion, at least one of the corner portions being a cutting portion,
wherein
the main body portion comprises a main body portion outer peripheral surface that is located between and intersects the first main surface and the second main surface,
the main body portion outer peripheral surface comprises a recessed portion, and
the main body portion outer peripheral surface has a thickness larger than a thickness of the cutting portion,
the main body portion comprises:
a first region connected to the through-hole, and
a second region intersecting the main body portion outer peripheral surface,
wherein the second region is thicker than the first region.

3. The cutting insert according to claim 2, wherein the first region and the second region are flat.

4. The cutting insert according to claim 2, wherein the main body portion further comprises a first inclined surface located between the first region and the second region.

5. The cutting insert according to claim 4, wherein the body further comprises a second inclined surface located between the main body portion and the corner portions, and
the second inclined surface has a concave shape in a front view of the first main surface.

6. The cutting insert according to claim 2, wherein the recessed portion comprises
a curved surface portion, and
a flat surface portion on both sides of the curved surface portion.

7. The cutting insert according to claim 6, wherein the flat surface portion is orthogonal to the first main surface.

8. The cutting insert according to claim 6, wherein, in a front view of the first main surface, the through-hole is located in a region of the main body portion inwardly from imaginary extended lines of the flat surface portions.

9. The cutting insert according to claim 2, wherein the cutting portion comprises:
a first part comprising a rake face, a relief face and a cutting edge where the rake face and the relief face intersect; and
a second part located between the first part and the main body portion, and
a thickness of the first part is larger than a thickness of the second part.

10. The cutting insert according to claim 2, wherein the recessed portion consists essentially of one or more surfaces extending orthogonally from the first main surface to the second main surface for the thickness of the main body portion.

11. The cutting insert according to claim 6, wherein the curved surface portion is orthogonal to the first main surface.

12. A cutting tool comprising:
a holder comprising an insert pocket on a leading end of the holder; and
the cutting insert according to claim 2, located in the insert pocket.

13. A method for manufacturing a machined product, the method comprising:
rotating a workpiece;
bringing the cutting tool according to claim 12 into contact with the workpiece that is rotating; and
separating the cutting tool from the workpiece.

* * * * *